(12) United States Patent
Foner (10) Patent No.: US 11,041,584 B2
(45) Date of Patent: Jun. 22, 2021

(54) LATCH MECHANISM FOR MULTI-COUPLING

(71) Applicant: Parker-Hannifin Corporation, Cleveland, OH (US)

(72) Inventor: Brian K. Foner, St. Louis Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/641,909

(22) PCT Filed: Nov. 13, 2018

(86) PCT No.: PCT/US2018/060654
§ 371 (c)(1),
(2) Date: Feb. 25, 2020

(87) PCT Pub. No.: WO2019/099354
PCT Pub. Date: May 23, 2019

(65) Prior Publication Data
US 2020/0248856 A1 Aug. 6, 2020

Related U.S. Application Data (60) Provisional application No. 62/588,655, filed on Nov. 20, 2017.

(51) Int. Cl.
*F16L 37/56* (2006.01)
*F16B 2/18* (2006.01)
*F16L 37/16* (2006.01)

(52) U.S. Cl.
CPC ............. *F16L 37/56* (2013.01); *F16B 2/185* (2013.01); *F16L 37/16* (2013.01); *F16L 2201/20* (2013.01)

(58) Field of Classification Search
CPC ............ F16B 2/185; F16L 39/00; F16L 37/56
(Continued)

(56) References Cited

U.S. PATENT DOCUMENTS

| 3,527,480 A | 9/1970 | Larson |
| 4,222,593 A | 9/1980 | Lauffenburger et al. |

(Continued)

FOREIGN PATENT DOCUMENTS

| DE | 9 209 060 U1 | 12/1992 |
| EP | 2 360 413 | 8/2011 |

(Continued)

OTHER PUBLICATIONS

International Search Report and Written Opinion issued by WIPO for corresponding International Patent Application No. PCT/US2018/060654 dated Feb. 12, 2019.

*Primary Examiner* — David Bochna
(74) *Attorney, Agent, or Firm* — Renner, Otto, Boisselle & Sklar, LLP (57) ABSTRACT

A multi-coupling system includes a first multi-coupling component including a plurality of individual first fluid couplers, and a second multi-coupling component including a plurality of individual second fluid couplers. The second multi-coupling component includes a locking pin assembly that is attached to a handle assembly, the locking pin assembly including a locking pin that is moveable in an axial direction between an extended position and a retracted position; a housing that houses the plurality of individual second fluid couplers, the housing further including a locking pin hole; and an operating lever configured to manipulate the locking pin assembly. In a connected and locked state, the locking pin is in the extended position in which a shaft end of the locking pin is located in the locking pin hole, thereby preventing rotation of the handle assembly. The locking pin assembly is manipulated by a user operation of (Continued)

the operating lever to move the locking pin from the extended position to the retracted position out from the locking pin hole to configure the multi-coupling system in a connected and unlocked state in which the handle assembly is rotatable to reconfigure the multi-coupling system to the disconnected state.

14 Claims, 8 Drawing Sheets

(58) Field of Classification Search
USPC ............... 285/124.3, 124.1, 124.2, 124.4, 91
See application file for complete search history.

(56) References Cited

U.S. PATENT DOCUMENTS

| | | | |
|---|---|---|---|
| 4,394,039 A | | 7/1983 | Burquier |
| 4,494,775 A | | 1/1985 | Nash et al. |
| 4,615,546 A | | 10/1986 | Nash et al. |
| 5,224,740 A | | 7/1993 | Smith |
| 5,316,347 A | | 5/1994 | Arosio |
| 5,342,098 A | | 8/1994 | Wilkins |
| 5,507,530 A | * | 4/1996 | Mahaney .............. E02F 3/3654 285/124.1 |
| 6,298,876 B1 | * | 10/2001 | Bogdonoff .............. F16L 37/18 137/614.04 |
| 6,439,558 B1 | * | 8/2002 | Arosio ................. B23Q 1/0018 269/20 |
| 6,471,250 B2 | | 10/2002 | Smith, III |
| 7,258,369 B2 | | 8/2007 | Martin |
| 7,389,794 B2 | | 6/2008 | Knuthson |
| 8,262,136 B2 | | 9/2012 | Lundgren |
| 8,336,922 B2 | * | 12/2012 | Tiberghien .............. F16L 37/56 285/124.3 |
| 2005/0285390 A1 | * | 12/2005 | Martin .................... F16L 37/56 285/124.5 |
| 2011/0198840 A1 | | 8/2011 | Sorbi et al. |
| 2016/0109044 A1 | | 4/2016 | Danelli et al. |
| 2017/0175783 A1 | | 6/2017 | Debernardi et al. |
| 2017/0202128 A1 | * | 7/2017 | Emmert ............... A01B 61/025 |

FOREIGN PATENT DOCUMENTS

| | | |
|---|---|---|
| EP | 2 476 941 | 3/2013 |
| EP | 2 740 985 | 6/2014 |
| EP | 2 818 596 | 12/2014 |
| EP | 2 884 146 | 6/2015 |
| EP | 2 095 002 | 8/2015 |
| EP | 3 608 578 | 2/2020 |
| WO | 2018/044977 | 3/2018 |

* cited by examiner

LATCH MECHANISM FOR MULTI-COUPLING

RELATED APPLICATIONS

This application is a national stage application pursuant to 35 U.S.C. § 371 of PCT/US2018/060654 filed on Nov. 13, 2018, which claims the benefit of U.S. Provisional Application No. 62/588,655 filed Nov. 20, 2017, the contents of which are incorporated herein by reference.

FIELD OF INVENTION

The present invention relates generally to quick couplings, and more particularly to multi-couplings for connecting multiple fluid lines in high pressure and other fluid systems, such as hydraulic fluid systems.

BACKGROUND OF THE INVENTION

Quick couplings in general are common devices for coupling fluid lines without the need for special tools. Quick couplings, for example, may be configured as individual couplings for the connection of a single fluid line. An exemplary use of quick couplings is in the connection of hydraulic fluid lines in hydraulic systems. Individual quick couplings typically have a ball locking mechanism to hold two halves of the coupling together as they try to separate from internal pressures. Quick couplings may be configured as a multi-coupling for connecting any number of multiple fluid lines. A multi-coupling constitutes a group of quick couplings mounted together in a plate or casting. In place of an individual locking mechanism for each individual coupling, a multi-coupling typically has a multi-line connection and locking mechanism that connects and holds the group of individual couplings together. The mechanical advantage of this single multi-line connection and locking mechanism is often beneficial to overcome the combined forces required to connect all of the quick couplings simultaneously.

An exemplary use of multi-couplings with a multi-line connection mechanism is with mobile equipment, such as for example compact farm tractors and similar equipment or vehicles. Often times with such mobile equipment, more than one hydraulic fluid line is needed to run a hydraulic tool or implement, such as a front loader, plow attachment, or the like. The use of standard individual couplings would require the user to make all connections with multiple different connecting steps. A multi-coupling with a multi-line connection can be connected without having to perform individualized connections for each hydraulic fluid line, which saves time and effort. In addition, a multi-coupling generally prevents a user from connecting the wrong hose on the implement to the wrong coupling port on the piece of equipment such as a base vehicle. In the example of a compact farm tractor, different tool implements (e.g., a front loader, plow attachment, etc.) may be mounted to the tractor. The hydraulic fluid system typically employs four individual hydraulic lines, which commonly conform to ISO 16028 size 6.3 mm geometry as an industry standard. Per ISO 16028, all the couplings in the multi-coupling are non-spill couplers meaning there is only a small amount of spillage upon disconnect. This style of coupling also has a flush faced design, which is preferred in applications in which there may be substantial debris. If any debris gets on the face of the coupling, the debris can be wiped off and does not get ingested into the hydraulic system.

Conventional multi-couplings have certain deficiencies. Common issues with multi-couplings are associated with the need to limit the size and weight while still maintaining effective connections. Size and weight particularly are issues that must be addressed in relatively small equipment, such as compact tractors referenced above and similarly sized or configured equipment or vehicles. Because the multi-coupling needs to house multiple individual couplings and resist separation force due to the hydraulic pressure, the multi-coupling can become large due to the need for effective connection. One conventional category of configuration of multi-coupling is a cam slot style multi-coupling. A bushing slides in a slotted cam which pulls and locks the multi-coupling halves together. Slotted cam style couplings generally have two slotted cams that lock the multi-coupling halves together. Another conventional configuration of multi-coupling is a camshaft locking style multi-coupling. In such configuration, a single lever operates multiple cam locking mechanisms to provide the multi-line connection.

As referenced above, some conventional multi-coupling connection mechanisms provide a handle that a user manipulates to operate the connection mechanism. In such systems, the multi-coupling requires a lock feature for the handle so the multi-coupling cannot be accidentally disconnected. Conventionally, a two-handed operation is required to operate the multi-coupling connection mechanism. The lock device needs to be actuated and held in position with one hand, while a second hand simultaneously begins the handle rotation. This two-handed operation can be difficult to perform particularly in tight spaces often associated with multi-couplings, and also precludes the use of one hand to operate the multi-coupling and use of the second hand to operate another tool or monitoring/measuring device (e.g., a temperature or pressure measuring device). In addition, a conventional multi-coupling component typically is configured as matched only for connecting to a complementary multi-coupling component, so that only the mating multi-coupling components can be connected. This could provide a problem to a user that has a multi-coupling component on the piece of equipment, but only loose couplings on the implement to be connected.

SUMMARY OF THE INVENTION

The present invention pertains to an enhanced multi-coupling system for a multi-line connection having multiple individual quick couplings that are arranged in a compact arrangement and can be manipulated with a one-handed operation. The multi-coupling includes a mobile component and a fixed component, with one of the components having a handle assembly to pull the two components together into a secured multi-line connection. The joining of the mobile and fixed components may be guided by guide pins. The fluid line couplers may be located between the joining cam and the guide pins to reduce the separation of the plates when the couplings are pressurized.

To provide a secure multi-line connection, the multi-coupling system may include an enhanced locking pin assembly and corresponding features in the casting of the multi-coupling components that cooperate with the locking pin assembly for an effective securing of the multi-line connection. In this manner, accidental operation of the handle assembly to open the multi-coupling is prevented, and the locking pin assembly thus prevents accidental disconnection of the multi-coupling. The locking mechanism of the present invention requires only one hand for operation, which takes up less space and is easier to operate as compared to conventional two-handed mechanisms. The locking pin assembly may include a locking pin that moves within a pin assembly body. In an example operation, a user manipulates an operating lever while maintaining control of the handle with one hand. The operating lever turns a knob of the locking pin assembly, which pulls a shaft end of the locking pin out of the multi-coupling casting and places the locking pin in a detent position in the locking pin assembly body. The pin rides on an inclined surface of the multi-coupling housing when the multi-coupling is disconnected. The angle of the inclined surface on the housing of the multi-coupling pushes on the locking pin and removes the locking from the detent position in the locking pin assembly body. This operation resets the position of the locking pin, and when the user makes the next connection, the locking pin automatically locks again.

The locking pin assembly may have a torsion and compression spring. This spring biases the shaft of the locking pin into the multi-coupling casting and torques the locking shaft with respect to the locking pin assembly body. The locking pin assembly body may include a spiraled surface that interacts with a dowel pin on the locking pin. Because of the spiral surface on the pin body, when the operating lever is rotated to turn the knob toward a disconnection position, the dowel pin rotates and interacts with the spiral surface, which retracts the locking pin shaft out of the casting. The user may rotate the operating lever to turn the knob until the dowel pin rests in the detent slot. When the coupling is disconnected, the pin shaft rides on the casting on the inclined surface that pushes the shaft into the body and the dowel pin out of the detent slot. In this disconnected state, from the torsion and compression spring the shaft automatically resets and will lock the multi-coupling in the connected state during a subsequent connection operation.

The operating lever may be configured as a lever that is press fit over the knob of the locking pin assembly of the locking mechanism. The operating lever is positioned with respect to the handle to permit a full one-handed operation, whereby the operating lever easily can be activated by a thumb or finger while the user's hand is otherwise positioned to operate the handle.

The fixed component of the multi-coupling is configured so that the individual coupler nipples can connect to individual or "loose" female couplers (i.e., couplers not incorporated into a multi-coupling component). Male couplers on the fixed component may be configured as male nipple cartridges having the same geometry as set forth in ISO 16028 size 6.3 mm so that a standard off-the shelf loose coupler can be connected to them. There is also enough space in the fixed component so that the female couplers fit within the confined of the fixed component. This permits loose female couplers on the mobile component to connect to the male couplers on the fixed component.

An aspect of the invention is a multi-coupling system that is operable with one hand and having an operating lever that operates a locking mechanism with the user's hand positioned about the system handle. In exemplary embodiments, a multi-coupling system includes a first multi-coupling component including a plurality of individual first fluid couplers, and a second multi-coupling component including a plurality of individual second fluid couplers, the multi-coupling system being configurable between a connected and locked state and a disconnected state. In the connected and locked state at least a portion of the first fluid couplers respectively are fluidly connected to the second fluid couplers, and in the disconnected state the first fluid couplers and the second fluid couplers are disconnected, the multi-coupling system being further configurable in a connected and unlocked state. The second multi-coupling component includes a locking pin assembly that is attached to a handle assembly, the locking pin assembly including a locking pin that is moveable in an axial direction between an extended position and a retracted position; a housing that houses the plurality of individual second fluid couplers, the housing further including a locking pin hole; and an operating lever configured to manipulate the locking pin assembly. In the connected and locked state the locking pin is in the extended position in which a shaft end of the locking pin is located in the locking pin hole, thereby preventing rotation of the handle assembly. The locking pin assembly is manipulated by a user operation of the operating lever to move the locking pin from the extended position to the retracted position out from the locking pin hole to configure the multi-coupling system in the connected and unlocked state in which the handle assembly is rotatable to reconfigure the multi-coupling system to the disconnected state. The locking pin assembly is configured to automatically retain the locking pin in the retracted position when the multi-coupling system is in the connected and unlocked state.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

The present invention is described in part in connection with a suitable usage with a compact tractor system. It will be appreciated that such example is non-limiting, and the multi-coupling system of the present invention may be employed in any suitable usage for the connection of multiple individual couplings of fluid lines. In this example, the compact tractor may include a base vehicle that is connected to an implement device attached to the base vehicle, such as for example a front loader, snow plow, digger, or other suitable attachment.

The implement may include fluid lines that connect to cooperating fluid lines of the base vehicle for operation of the implement. In the example of a compact tractor system, the connection lines may include four individual hydraulic lines, although any number of individual fluid lines may be connected with the disclosed multi-coupling system. In exemplary embodiments, the fluid lines may conform to ISO 16028 size 6.3 mm geometry as an industry standard. Per ISO 16028, all the couplings in the multi-coupling are non-spill couplers meaning there is only a small amount of spillage upon disconnect. This style of couplings also has a flush faced design, which is preferred in applications in which there may be substantial debris. If any debris gets on the face of the coupling, the debris can be wiped off and does not get ingested into the hydraulic system. The use of ISO 16028 couplings also is a non-limiting example, and thus various categories, configurations, and numbers of individual couplings may be connected together with the multi-coupling system of the present invention.

This application presents an improvement over a previous design of Applicant, embodied in International Appl. No. PCT/US17/49282, filed on Aug. 30, 2017, the content of which is incorporated here by reference.

Figure 1:
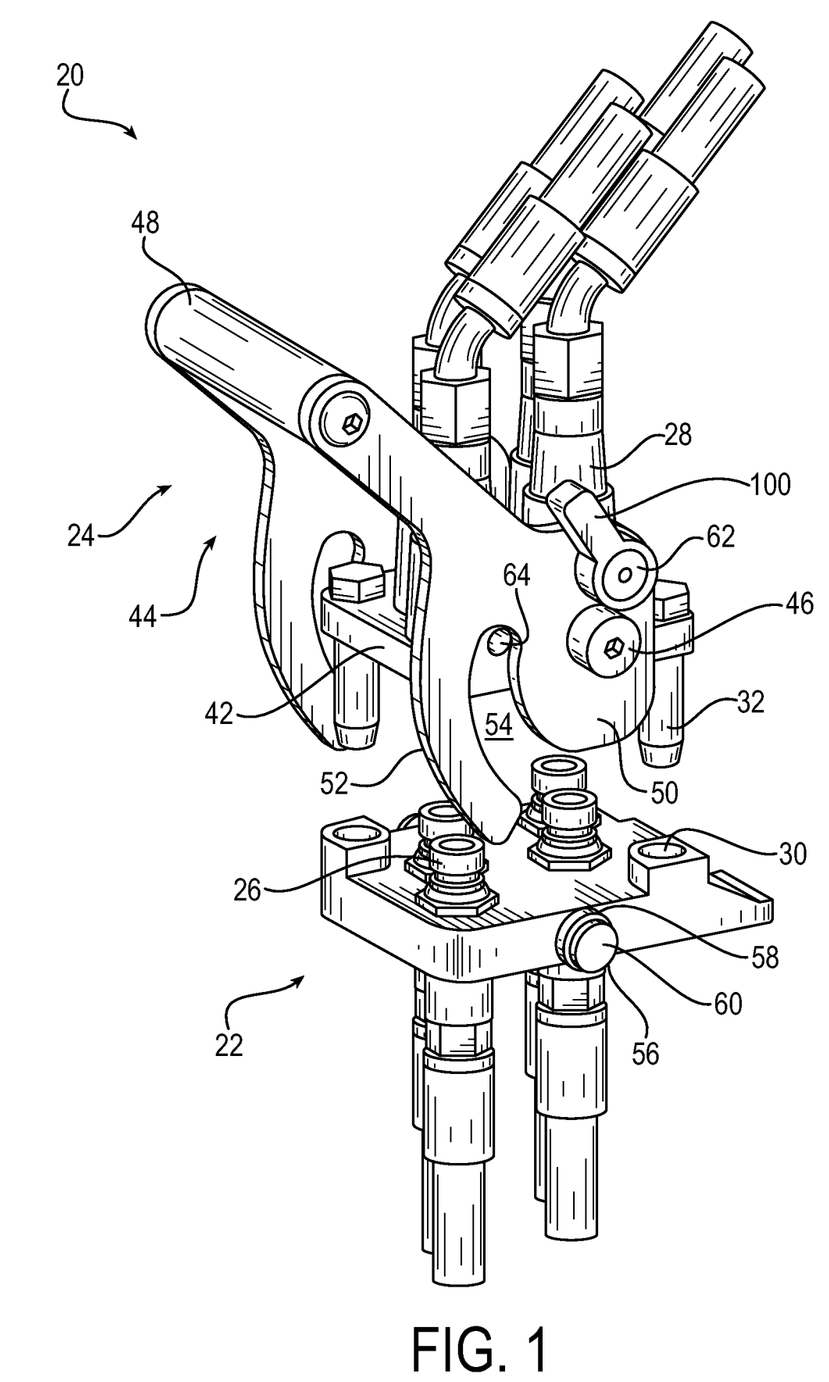
FIG. 1 is a drawing depicting a perspective view of an exemplary multi-coupling system in accordance with embodiments of the present invention, with the components in a disconnected state.

FIG. 1 is a drawing depicting a perspective view of an exemplary multi-coupling system 20 in accordance with embodiments of the present invention, with the components in a disconnected state. In an example usage, the multi-coupling system 20 may be employed as a multi-coupling for hydraulic fluid lines in a compact tractor system or similar vehicles or equipment in which a hydraulically operated implement may be connected to a base vehicle. The multi-coupling system 20 may include a first multi-coupling component 22 and a second multi-coupling component 24. The first multi-coupling component 22 may be fixed to a base vehicle or other base equipment generally in a secured fashion without being moveable. Accordingly, the first multi-coupling component 22 may be referred to also as the fixed component 22. The second multi-coupling component 24 generally may be moveable or manipulated with the implement into position to connect the first and second multi-coupling components. Accordingly, the second component 24 may be referred to also as the mobile component 24.

The first multi-coupling component may include a plurality of first individual fluid couplers 26, and the second multi-coupling component may include a plurality of second fluid couplers 28. In the example of the figures, four first fluid couplers 26 are provided for respective connection with four second fluid couplers 28. Also in this example, the first individual fluid couplers 26 may be a plurality of male nipple cartridges, and the second individual fluid couplers 28 may be a plurality of female couplers for receiving the male nipple cartridges. The first fluid couplers 26 may be adjoined to fluid lines on the first component side, and the second fluid couplers 28 similarly may be adjoined to fluid lines on the second component side The fluid lines (not specifically shown in the figures) may be hoses or like components for the transmission of fluid (e.g., hydraulic fluid) between the two components via the fluid connections formed by the joined fluid couplers. As referenced above, four fluid connections configured as shown in FIG. 1 would be suitable for use with compact tractor systems, which typically have four hydraulic fluid lines for operation of a connected implement. In addition, the male nipple cartridges and female couplers may conform to ISO 16028 size 6.3 mm standard couplings. Again, it will be appreciated that such example is non-limiting, and various categories, configurations, and numbers of individual couplings may be connected together with the multi-coupling system of the present invention. It will also be appreciated that the female and male couplers may be reversed for certain applications, with the male couplers being part of the mobile component and the female couplers being part of the fixed component.

The first/fixed component 22 may include one or more guide holes 30, and the second/mobile component 24 may include one or more guide pins 32. The guide holes 30 and guide pins 32 help ensure a proper alignment of the fluid couplers 26 and 28. In particular, the guide pins may be inserted into and received within the respective guide holes, which ensures a proper alignment of the fixed and mobile multi-coupling components. In the particular example of FIG. 1, two guide holes are provided for receiving two respective guide pins, although any suitable number may be employed. The guide pins and guides holes may be reversed, meaning that one of the mobile component or fixed component includes the plurality of guide pins, and the other of the mobile component or fixed component includes a plurality of guide holes.

The spacing between the fluid couplers is configured adequately to allow the individual fluid couplers 26 on the fixed component of the multi-coupling to connect to individual or "loose" female couplers (i.e., couplers not incorporated into a multi-coupling component or casting), which may be present on the mobile side. When the male fluid couplers on the fixed component are configured having the same geometry as set forth in ISO 16028 size 6.3 mm, for example, standard off-the-shelf female couplers can be connected to them. There is also enough space in the first coupling component so that the female couplers fit within the confines of the fixed component. In this manner, any loose individual female couplers on the mobile side can connect to the male couplers on the fixed component in addition or alternatively to female couplers incorporated into a multi-coupling component on the mobile side. The ability to connect loose female couplers to the first multi-coupling component is an advantage not present in conventional configurations.

The second/mobile component 24 may include a casting configured as a housing 42 that houses the plurality of individual second fluid couplers 28. The casting or housing 42 further may support a handle assembly 44 that is attached in a rotatable manner to the housing of the second multi-coupling component via a retention element 46. The retention element 46 may be a shoulder bolt or other suitable retention mechanism by which the handle assembly 44 is attached to the housing 42 in a manner that permits the handle assembly to rotate.

The handle assembly 44 may include a handle portion 48 that may be easily gripped by a user to rotate the handle assembly. To aid in comfort of operation, the handle portion 48 may have a rubber cover that extends over a metal or otherwise rigid extension to allow for easy and comfortable gripping. The handle assembly 44 further may include a plate portion 50 from which the handle portion extends perpendicularly, and the retention element 46 extends through the plate portion 50 to attach the handle assembly 44 to the casting or housing 42. In this manner, a force may be applied to the handle portion 48 by a user to rotate the handle assembly 44 to configure the multi-coupling system between the connected state and the disconnected state. The handle assembly further may include at least one hook retainer 52 that extends from the plate portion 50. The hook retainer(s) 52 and the plate portion 50 define one or more respective slots 54 configured to receive corresponding one or more rollers 56 located on the first/fixed component 22. The roller 56 includes a recessed neck 58 and a head 60 to so as to retain the hook retainer 52 in a locked position. Although the depicted example includes a dual set of hook retainers 50 and rollers 52, a single set of hook retainer 50 and roller 52 may be employed as described in Applicant's co-pending International Appl. No. PCT/US17/49282 referenced above.

Figure 2:
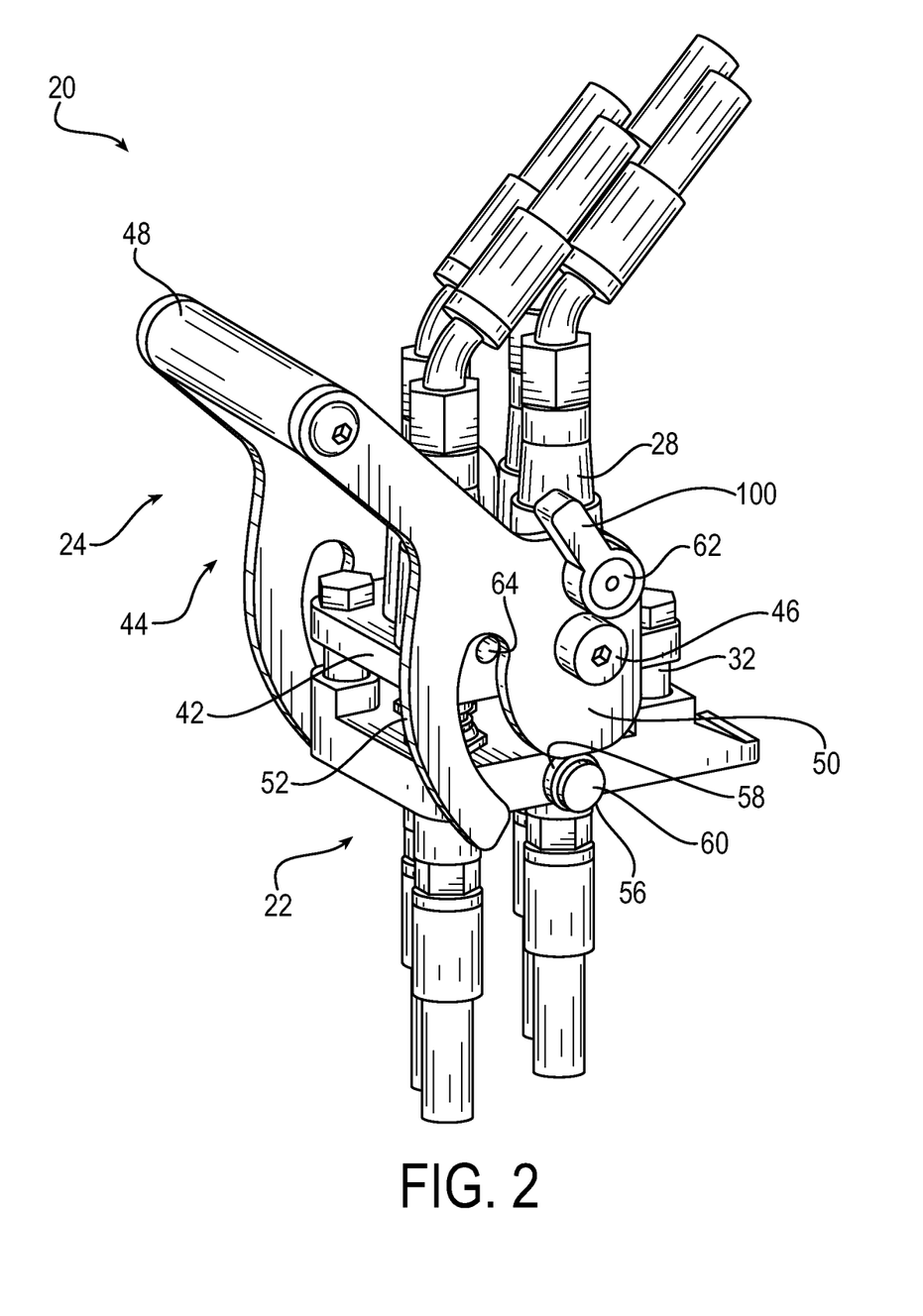
FIG. 2 is a drawing depicting a perspective view of the exemplary multi-coupling system of FIG. 1, with the components now configured with the mobile component partially joined with the fixed component.
Figure 3:
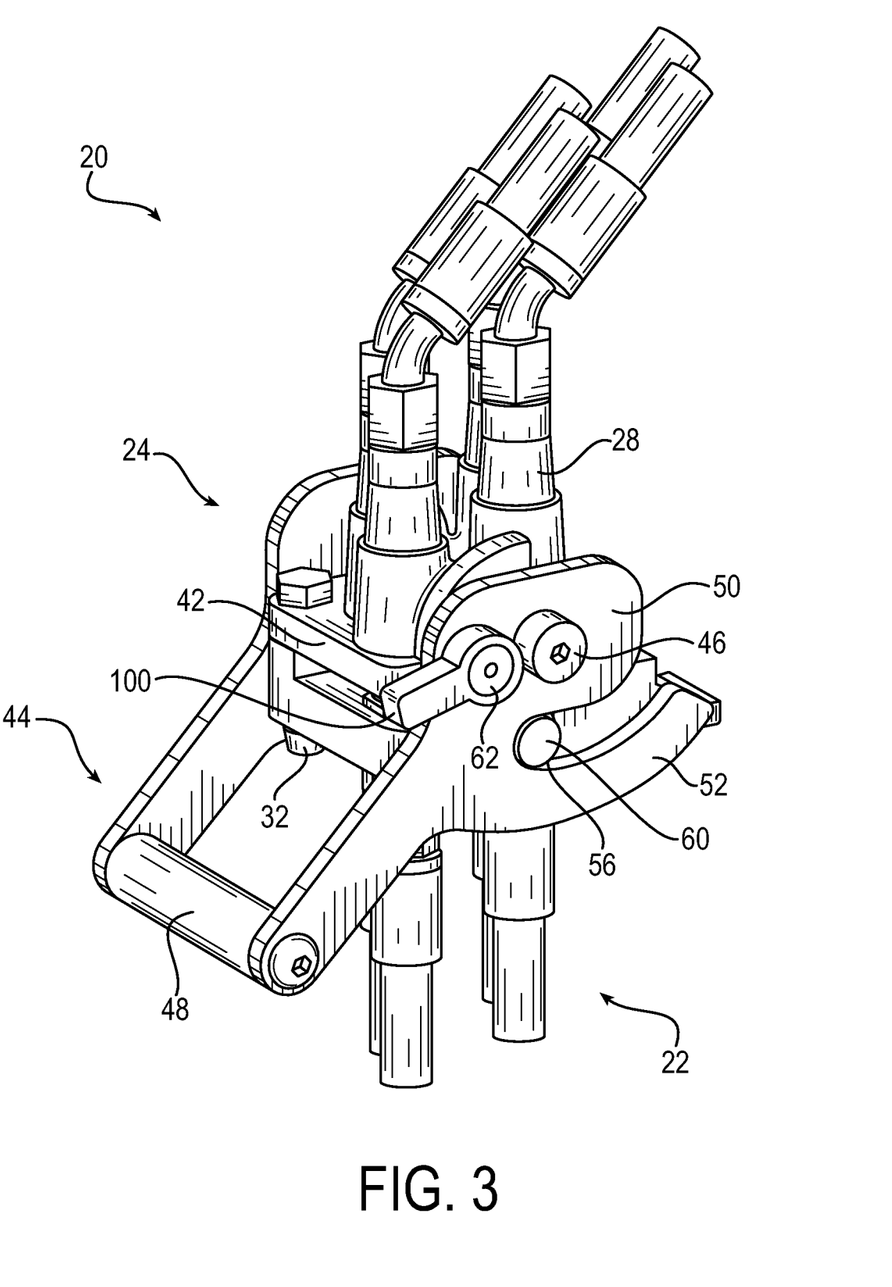
FIG. 3 is a drawing depicting a perspective view of the exemplary multi-coupling system of FIG. 1, with the components now configured with the handle moved to a connected position and the locking mechanism in a locked state to lock the components together.

FIG. 2 is a drawing depicting a perspective view of the exemplary multi-coupling system 20 of FIG. 1, with the components now configured with the mobile component partially joined with the fixed component. FIG. 3 is a drawing depicting a perspective view of the exemplary multi-coupling system of FIG. 1, with the components now configured with the handle moved to a connected position in a locked state to lock the components together. The manner of connection of the components of the multi-coupling system may be illustrated in more detail by reference for example to the progression from the disconnected state of FIG. 1 to the connected state of FIG. 3.

In general, the handle assembly is rotatable to configure the multi-coupling system between the disconnected state and the connected and locked state. As the handle assembly rotates, each hook retainer interacts as a single cam with the roller to pull the first and second multi-coupling components together from the disconnected state into the connected and locked state. Referring to the figures, the interaction of the hook retainer 52 and the roller 56 secures the first and second multi-coupling components 22 and 24 together. The second/mobile component 24 also may include a locking pin assembly 62 that is attached to the handle assembly 44. As further detailed below, a locking pin of the locking pin assembly engages a locking pin hole 64 in the casting or housing 42 of the second/mobile component 24, which is shown principally in FIGS. 1 and 2.

To join the first and second components 22 and 24, the guide pins 32 first may be inserted into the guide holes 30. If the second component 24 is considered the mobile component, the insertion may be achieved through manipulating or moving the mobile component into position with the guide pins received within the guide holes, the first component being the fixed component fixed to a base equipment. This properly aligns the components 22 and 24 so that the individual fluid couplers 26 become commensurately aligned with respective individual fluid couplers 28 (and/or any loose couplers on the mobile side). As such insertion of the guide pins into the guide holes proceeds, the roller 56 enters the slot 54 defined by the hook retainer 52 and plate 50. Because of the recessed nature of the neck 58 relative to the head 60 of the roller 56, the neck more specifically slides within the slot 54, and the head 56 presses against an external surface of the hook retainer to provide a secured engagement that cannot pull out in an axial direction perpendicular to a plane of rotation. A user may then apply a rotating force to the handle portion 48 to rotate the handle assembly 44 (e.g., in the counterclockwise direction based on the orientation in the figures, but the orientation can be varied). As the handle assembly 44 rotates, the interaction of the hook retainer 52 and the roller 56 pulls the components 22 and 24 together from the disconnected state into the connected and locked state of the overall multi-coupling system 20. Due to the referenced alignment of respective fluid couplers 26 and 28, fluid can now flow through the multi-coupling system to supply fluid and a return flow between the fixed side and the mobile side.

As seen in the connected depiction of FIG. 3, each hook retainer 52 is configured as a single cam that results in a secure connection of all four fluid lines solely by interaction with the roller respective roller 56. Accordingly, this single cam connection is far less complex, and therefore of smaller size and weight, as compared to conventional configurations that employ multiple cam locking mechanisms. The hook/roller interaction additionally leaves largely free access to the fluid lines, which also helps permit the connection of additional loose individual fluid couplers should such need be present. The ability to connect loose fluid lines is far more difficult, and in some cases not available at all, in conventional configurations with multiple locking mechanisms, insofar as the interaction of the conventional multi-coupling components tends to span or encompass the spatial area of the fluid connections.

The locking mechanism generally may be described as follows. The multi-coupling system further may be configurable in a connected and unlocked state. The second multi-coupling component may include a locking pin assembly that is attached to the handle assembly, the locking pin assembly including a locking pin that is moveable in an axial direction between an extended position and a retracted position. The second multi-coupling component further may include a housing that houses the plurality of individual second fluid couplers, the housing further including a locking pin hole. In the connected and locked state, the locking pin is in the extended position in which a shaft end of the locking pin is located in the locking pin hole, thereby preventing rotation of the handle assembly. The locking pin assembly is manipulated by a user to move the locking pin from the extended position to the retracted position out from the locking pin hole to configure the multi-coupling system to the connected and unlocked state in which the handle assembly is rotatable to reconfigure the multi-coupling system to the disconnected state. The locking pin assembly is configured to automatically retain the locking pin in the retracted position when the multi-coupling system is in the connected and unlocked state. In addition, the locking pin assembly also may be configured to reset the locking pin automatically when the handle assembly is rotated toward configuring the multi-coupling system in the disconnected state.

Referring to the FIGS. 1-3, as the handle assembly 44 rotates to configure the multi-coupling system from the disconnected state to the connected and locked state, the locking pin assembly 62 becomes aligned with the locking pin hole 64. Upon reaching such alignment, a biased locking pin of the locking pin assembly axially extends into the locking pin hole 64. In this manner, the axial extension of the locking pin located into the locking pin hole locks the handle assembly in the connected position, which prevents accidental operation of the handle assembly to open the multi-coupling system, and the locking pin thus in turn prevents accidental disconnection of the multi-coupling component 24 from component 22.

Figure 4:
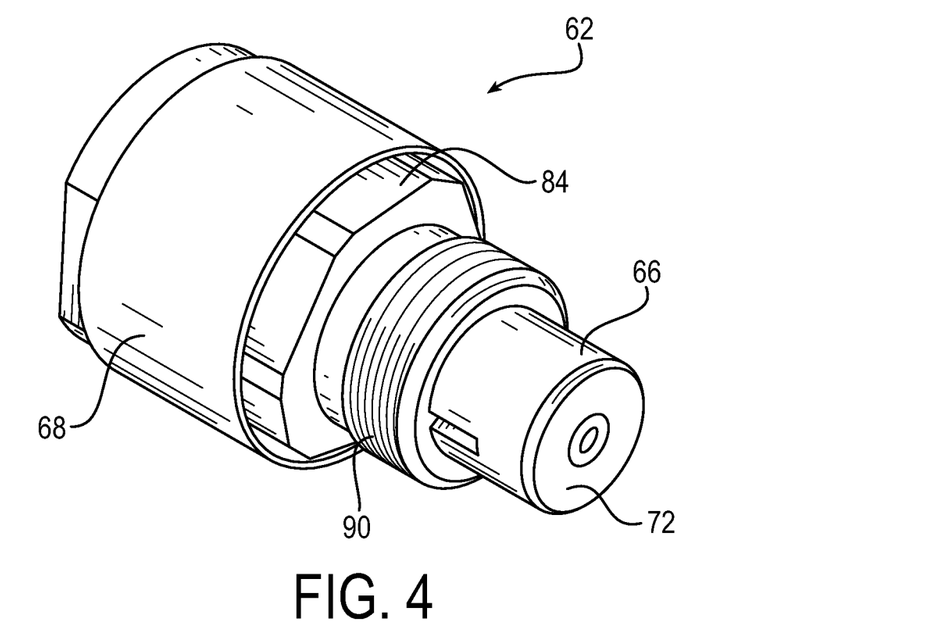
FIG. 4 is a drawing depicting a perspective view of an exemplary locking pin assembly for the multi-coupling system in accordance with embodiments of the present invention.
Figure 5:
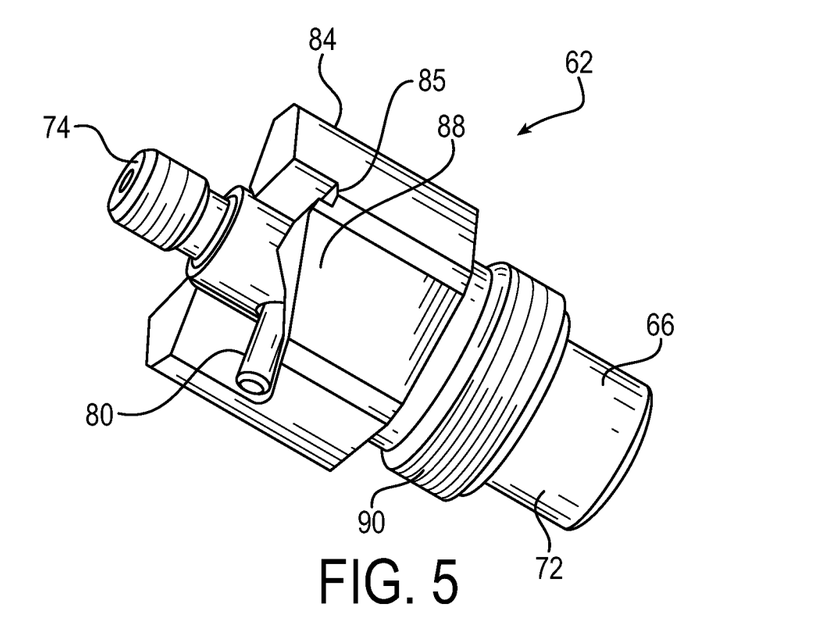
FIG. 5 is a drawing depicting another perspective view of the exemplary locking pin assembly of FIG. 4, with the knob removed.
Figure 6:
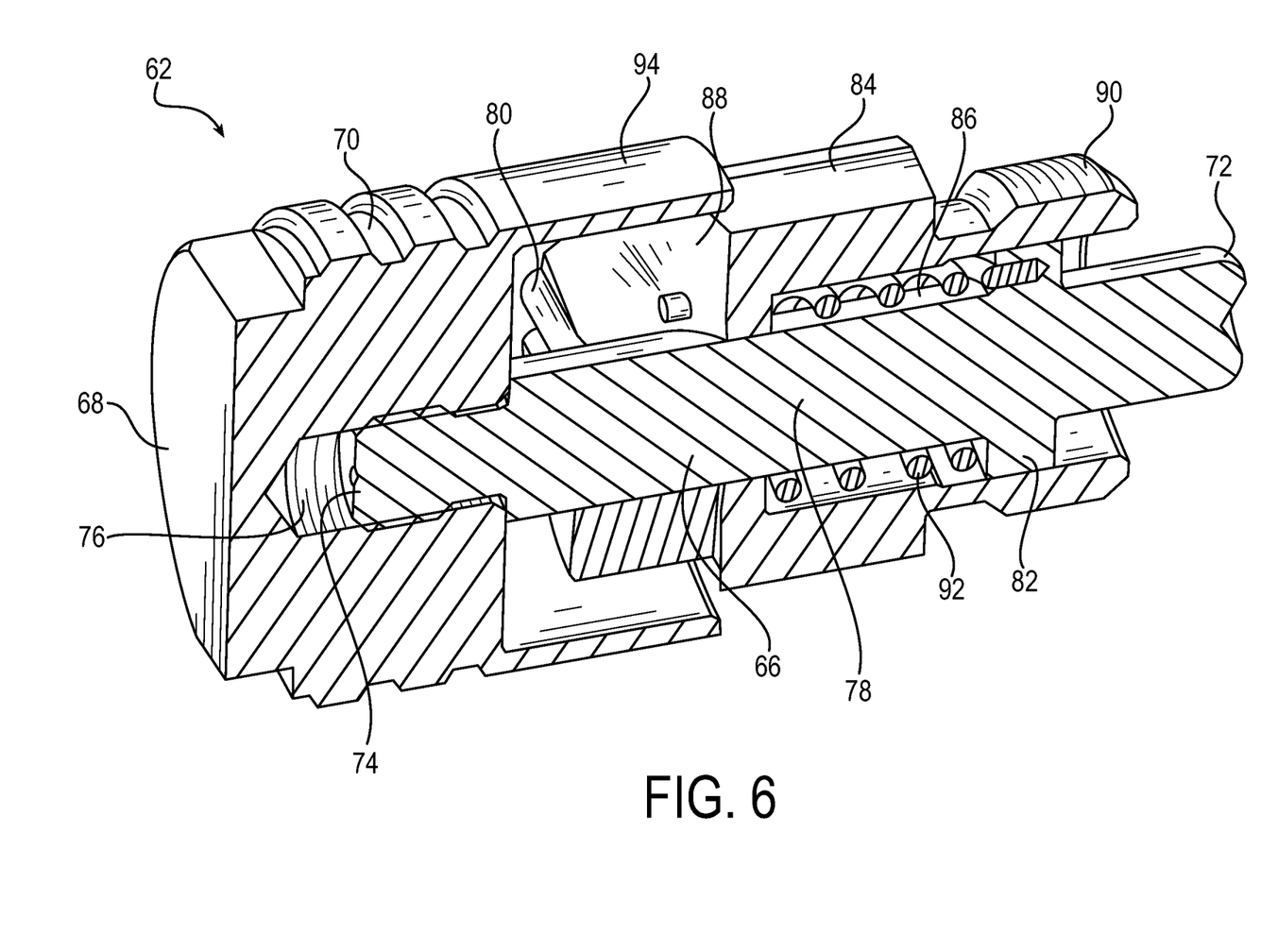
FIG. 6 is a drawing depicting a perspective and cross-sectional view of the exemplary locking pin assembly of FIGS. 4 and 5.

A more detailed configuration of an exemplary configuration of the locking pin assembly 62 is illustrated in FIGS. 4-6, which depict various views of the locking pin assembly 62. In particular, FIG. 4 is a drawing depicting a perspective view of the exemplary locking pin assembly 62, and FIG. 5 is a drawing depicting another perspective view of the exemplary locking pin assembly 62 of FIG. 4 with a knob 68 removed. FIG. 6 is a drawing depicting a perspective and cross-sectional view of the exemplary locking pin assembly 62 of FIGS. 4 and 5.

The locking pin assembly 62 may include the locking pin 66 at a first end and a knob 68 at a second end opposite from the first end. The locking pin 66 further may include a shaft end 72 at the first end of the locking pin assembly farthest from the knob 68. The shaft end 72 is the portion of the locking pin that moves into and out from being located in the locking pin hole 64 in the housing 42, so as to lock and unlock the multi-coupling assembly. As seen particularly in FIGS. 5 and 6, the locking pin 66 further may have a distal end 74 that is opposite from the shaft end 72. In addition, the knob 68 may define a central bore 76 that receives the distal end 74. The central bore 76 and distal end 74 may have cooperating mating threads or comparable fastening structures, such that the locking pin 66 is connected at the distal end 74 to the knob 68. The locking pin 66 further may include a central portion 78 that is located between the shaft end 72 and the distal end 74. The locking pin 66 further may include a dowel pin 80 that extends outward from the central portion 78 perpendicularly to the axial direction, and a guiding ridge 82 for guiding movement of the locking pin within the locking pin assembly.

The locking pin assembly 62 further may include a body 84. The body 84 may define a central passage 86 through which the locking pin 66 moves. The body 84 may include a spiral surface 88 at a first end of the body, and a fixing end 90 with the spiral surface 88 being located at an end of the body opposite from the fixing end. The fixing end 90 may include threads or comparable fastening structures that cooperate with complementary structures provided in a mounting bore defined by the plate 50 of the handle assembly 44. In this manner, the locking pin assembly is fixed via the fixing end to the handle assembly 44. The body 84 may define a detent slot 85 (see particularly FIG. 5) that is adjacent to an upper end of the spiral surface 88. The locking pin 66 is moveable within the central passage 86 relative to the body 84 along an axial direction of a longitudinal axis of the locking pin.

The body 84 of the locking pin assembly may house a torsion and compression spring 92 located within the central passage 86 defined by the body, which is anchored at one end in the body 84 adjacent to the spiral surface 88, and anchored at an opposite end within the guiding ridge 82 of the locking pin. The spring 92 is configured to have a compression bias that biases the locking pin 66 toward the extension position axially outward through the fixing end of the body 84 (i.e., to the right in the specific orientation depicted in FIG. 6). The spring 92 also is configured to have a torsion bias that biases the locking pin 66 in a rotation direction away from the detent slot to an initial state as shown in FIG. 5 (i.e., in a clockwise direction in the specific orientation depicted in FIG. 6). The knob 68 may include an extension 94 that extends around the body 84.

Operation of the multi-coupling system 20 may be illustrated as follows. As referenced above, FIG. 3 depicts the multi-coupling system 20, with the first and second components 22 and 24 in a combined connected and locked state. FIG. 5 is illustrative of the positioning of the locking pin assembly 62 in such connected and locked state. Due to the compression spring bias of spring 92, the locking pin 66 is maximally extended through the body 84, and thus is located in the locking pin hole 64 in the casting or housing 42 shown in FIGS. 1 and 2. In such position, movement of the handle assembly is precluded to prevent any accidental disconnection of the multi-coupling components. The dowel pin 80 rests against the body 84 of the locking pin assembly at the base of the spiral surface 88. The interaction of the dowel pin and body in this state, therefore, prevents the locking pin from extending beyond the maximum suitable for locking with the locking pin hole.

To unlock the locking pin assembly 62, a user may manipulate the knob 68 to move the locking pin 66 to the retracted position out from the locking pin hole 64. In the example of the figures, an unlocking manipulation may be performed by turning the knob 68 to rotate the knob counterclockwise. Due to the connection of the locking pin 66 to the knob 88 (via the connection features of the knob central bore 76 and the pin distal end 78), the knob rotation is imparted to the locking pin 66, which in turn rotates with the knob 68. As the locking pin 66 rotates, the dowel pin 80 moves along the spiral surface 88, and due to the inclined nature of the spiral surface 88, an axial motion is imparted to the locking pin toward the retracted position opposite from the extended position. In other words, an interaction of the dowel pin against the spiral surface moves the locking pin from the extended position to the retracted position when the locking pin assembly is manipulated by the user rotation of the knob 68. In particular, the locking pin 66 is retracted away from the locking pin hole 64 as the dowel pin slides along the spiral surface. Because the knob 68 also is moved by the axial retraction, the extension 94 of the knob 68 slides along an outer surface of the body 84 when the locking pin is moved between the extended position and the retracted position.

The axial and rotational movement of the locking pin 66 is against both the compression bias and the torsion bias of the spring 92. Accordingly, when the locking pin is in the retracted position and the dowel pin 80 reaches the detent slot 85 at the upper end of the spiral surface 88, under mainly the spring compression bias the dowel pin 80 will snap into the detent slot 85. The positioning of the dowel pin within the detent slot prevents further rotation of the knob 68 and locking pin 66, and automatically retains the locking pin the retracted position. Such state of the locking pin assembly is shown in FIG. 6. With the locking pin retracted, a user may rotate the handle assembly oppositely from the position of FIG. 3 back to the position of FIG. 1. Such handle rotation moves the roller 56 out from being retained by the hook retainer 52, thereby disconnecting the multi-coupling components 22 and 24.

Figure 7:
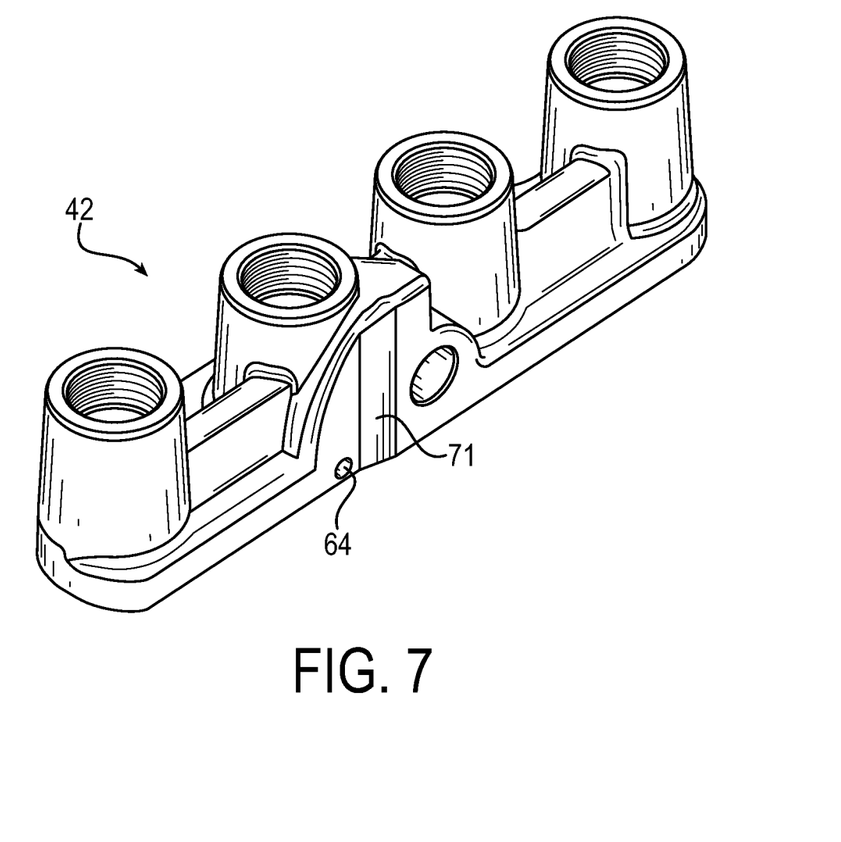
FIG. 7 is a drawing depicting a perspective view of an exemplary housing component of a multi-coupling system in isolation.

FIG. 7 is a drawing depicting a perspective view of an exemplary housing component 42 of the second component of exemplary multi-coupling system in isolation. In FIG. 7, the fluid couplings are linearly aligned but comparable principles may be applied with different fluid coupling alignments. The isolated view of the housing 42 in particular shows that the casting that forms the housing may include an inclined surface 71. As the handle assembly 44 is rotated from the connected position of FIG. 3 to the disconnected position of FIG. 1, the locking pin 66 rides along the inclined surface 71. Such interaction results in the locking pin 66 being forced inward within a body of the locking pin assembly, which automatically resets the locking pin. In particular, as the handle assembly 44 is rotated to re-configure the multi-coupling system from the connected to the disconnected state, the shaft end 72 of the locking pin 66 interacts against the inclined surface 71 by riding along the inclined surface 71. Such interaction results in the locking pin 66 being forced further in the retracting direction inward within the body 84 of the locking pin assembly, which is against the spring bias. This further retracts the locking pin such that the dowel pin 80 is pushed out from the detent slot 85. Additional details regarding operation of the locking mechanism are described in the International Application No. PCT/US17/49282 incorporated by reference as cited above.

Figure 8:
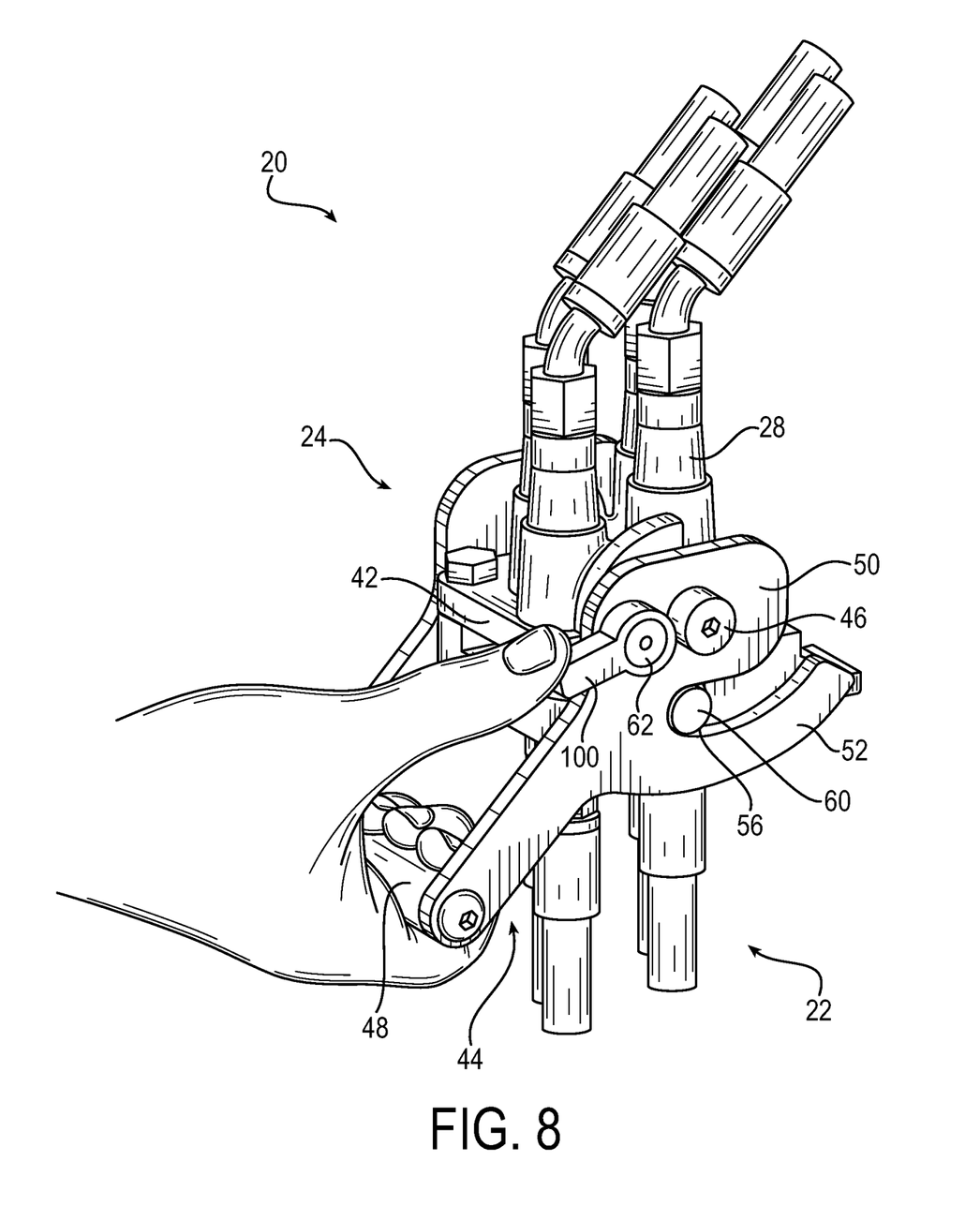
FIG. 8 is a drawing depicting a perspective view of the exemplary multi-coupling system as shown in FIG. 3, further illustrating a hand position for a one-handed disconnect operation.
Figure 9:
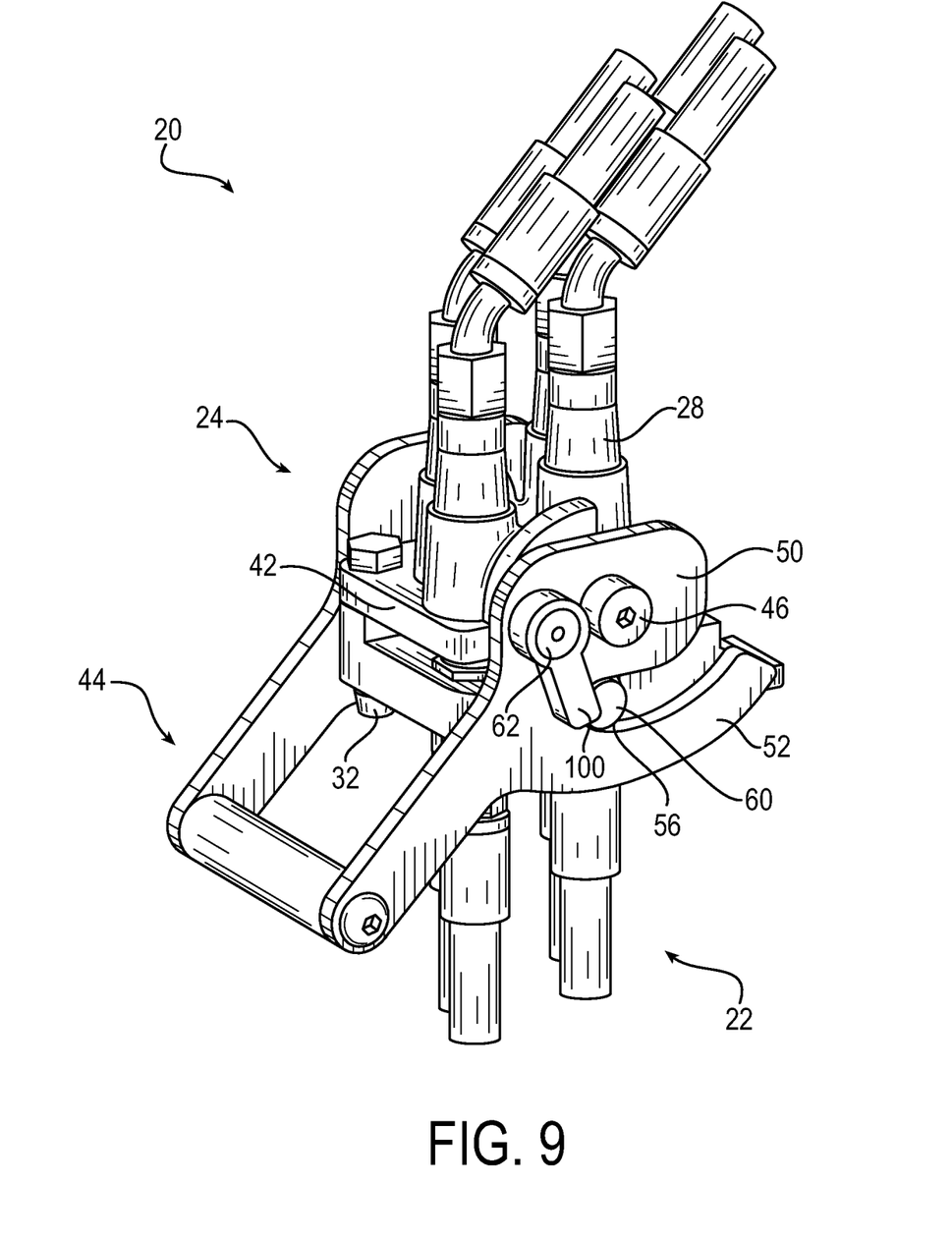
FIG. 9 is a drawing depicting a perspective view of the exemplary multi-coupling system connected comparably as in FIG. 3, and with the locking mechanism being moved to an unlocked state in preparation to disconnect the components.

The updated design of this disclosure improves the ergonomic interface between the user and the multi-coupling system, particularly during the disconnect operation, as depicted in FIGS. 1-3 and 8-9. In this regard, FIG. 8 is a drawing depicting a perspective view of the exemplary multi-coupling system in the locked state as shown in FIG. 3, further illustrating a hand position for a one-handed disconnect operation. FIG. 9 is a drawing depicting a perspective view of the exemplary multi-coupling system connected comparably as in FIG. 3, and with the locking mechanism being moved to an unlocked state in preparation to disconnect the components.

As seen in such figures, the multi-coupling system 20 further includes an additional operating lever 100 that can be manipulated for operating the locking mechanism by imparting rotation to the knob 68 of the locking pin assembly 62. The operating lever 100 may be configured as a lever that is press fit over the knob 68 of the locking pin assembly 62 of the locking mechanism. The operating lever preferably is made of a rigid plastic material that is suitable for a simple press fit connection. The operating lever 100 is positioned with respect to the handle 48 to permit a full one-handed disconnect operation, whereby the operating lever 100 easily can be activated by a thumb or finger while the user's hand is otherwise positioned to operate the handle.

In the configuration of the design of Applicant's previous application referenced above, operation of the locking pin assembly 62 required the user to first place the hand in a position that was dedicated to rotating the locking feature of the pin assembly to the detented unlocked position, and then reposition the hand on the handle to rotate the handle up to an unlocked position. The design described in this disclosure allows the user to place the hand in only one position, flip or rotate the operating lever 100 with thumb or finger to move the pin assembly to the detented unlocked position, and then rotate the handle to disconnect the multi-coupling system, all in one position of the hand for an easy one-handed operation. An additional advantage of the operating lever 100 is that the operating lever allows for operation of the locking feature of the locking pin assembly without requiring hand clearance at the side of the multi-coupling system in applications in which there is little or no clearance available for a hand to turn the knob 68 of the pin assembly 62 to unlock the multi-coupling system for disconnection.

FIGS. 2-3 and 8-9 illustrate operation of the operating lever 100. Generally, the operating lever is positionable in three operating positions: a ready position, a locked position, and an unlocked or detented position. In the state of FIG. 2, as described above the mobile second multi-coupling component 24 including the handle 48 is inserted into the fixed first multi-coupling component 22. In this state, the guide pins 32 of the second multi-coupling component are inserted into the mating holes 30 of the first multi-coupling component, but the two multi-coupling components are not yet engaged. The handle 48 remains in a disconnected position, and the operating lever 100 is configured in a first or ready position.

In the state of FIG. 3, the handle 48 has been operated to move the handle to the connected position in which all the couplings are mated together. In addition, the operating lever 100 is now moved to locked position, with the locking pin of the locking assembly 62 extending into the locking hole 64 as described above. FIG. 3, therefore, illustrates the operating lever 100 in the second locked position. Referring to FIG. 8 in combination with FIG. 3, essentially the described configuration of the locked state permits a user to grip the handle with a one-handed operation with the user's thumb being positioned to rotate the operating lever, by which the operating lever rotates the pin assembly to enable unlocking the coupling components so that the coupling components can be disconnected. FIG. 8, therefore, in particular illustrates the hand positioning for a one-handed disconnection operation. When the multi-coupling is ready for disconnection, the user's hand can be placed on handle 48 in an operable position with thumb or finger within reach to operate the operating lever 100 of the locking mechanism as illustrated in FIG. 8.

The further operation of the operating lever 100 is shown in FIG. 9, in which the operating lever is moved or rotated to the third or detented and unlocked position. To perform such operation, the thumb or finger of the user can now be moved away while the same hand remains in a position to operate the handle. Such operation releases the locked nature of the pin assembly 62 as described above for disconnection of the multi-coupling components, and the handle can be operated by the user to release the multi-coupling components. The system is then returned to the disconnected state as shown in FIG. 1, whereby the handle is rotated up to move the multi-coupling into a disconnected position in which the coupling components are no longer connected. The movement of the handle automatically moves the operating lever 100 out of the detented and unlocked position, and back into the ready position of FIGS. 1 and 2. With such movement, the locking pin assembly is also reset by by the locking pin sliding along the inclined housing portion 71 (see again FIG. 7). In this manner, the described configuration permits the user to place a hand in only one position, flip or rotate the operating lever 100 to move the locking pin assembly to the detented unlocked position, and then rotate the handle to disconnect and reset all in one position of the hand for an easy one-handed operation.

In the example of the figures referenced in the above description, the handle assembly and locking mechanism are provided on the mobile component, with the roller being located on the fixed component. The configuration may be reversed—the fixed component may include the handle assembly and locking mechanism, with the roller being located on the mobile component. Accordingly, as referenced above, the fixed and mobile components may be referred to more generally as first and second components, with either one of the components including the handle assembly and locking mechanism, and the other component including the roller for connecting with the handle assembly.

The configuration of the multi-coupling system 20 has advantages over conventional configurations in its operation for connecting, disconnecting, and re-connecting the multi-coupling components. The locking pin assembly and corresponding features in the casting that form the housing of the multi-coupling components (e.g., the locking pin hole and the inclined surface) cooperate for an effective securing of the multi-line connection. Because the hook retainer on the mobile component merely needs to interact with the roller on the fixed component in a single cam interaction, the securing mechanism is more compact, having less size and weight. In addition, the operation of the present invention requires only one hand—i.e., a user can simultaneously rotate the operating lever to turn the locking pin assembly to unlock the connection while gripping the handle for rotation and disconnection, all with the same hand as the locking pin assembly automatically retains the locking pin in the retracted position. The one-handed disconnection operation thus takes up less space and is easier to operate as compared to conventional two-handed mechanisms, and frees up the second hand for other tasks.

Furthermore, the bias of the torsion and compression spring biases the shaft end of the locking pin into the multi-coupling casting and torques the shaft with respect to the pin body. This results in a self-resetting configuration. In the disconnected state the locking pin automatically resets to permit locking the multi-coupling in the connected state in a subsequent connecting operation. This automatic resetting is more effective and simplified as compared to conventional configurations.

An aspect of the invention, therefore, is a multi-coupling system that is operable with one hand and having an operating lever that operates a locking mechanism with the user's hand positioned about the system handle. In exemplary embodiments, a multi-coupling system includes a first multi-coupling component including a plurality of individual first fluid couplers, and a second multi-coupling component including a plurality of individual second fluid couplers, the multi-coupling system being configurable between a connected and locked state and a disconnected state. In the connected and locked state at least a portion of the first fluid couplers respectively are fluidly connected to the second fluid couplers, and in the disconnected state the first fluid couplers and the second fluid couplers are disconnected, the multi-coupling system being further configurable in a connected and unlocked state. The second multi-coupling component in includes a locking pin assembly that is attached to a handle assembly, the locking pin assembly including a locking pin that is moveable in an axial direction between an extended position and a retracted position; a housing that houses the plurality of individual second fluid couplers, the housing further including a locking pin hole; and an operating lever configured to manipulate the locking pin assembly. In the connected and locked state the locking pin is in the extended position in which a shaft end of the locking pin is located in the locking pin hole, thereby preventing rotation of the handle assembly. The locking pin assembly is manipulated by a user operation of the operating lever to move the locking pin from the extended position to the retracted position out from the locking pin hole to configure the multi-coupling system in the connected and unlocked state in which the handle assembly is rotatable to reconfigure the multi-coupling system to the disconnected state. The locking pin assembly is configured to automatically retain the locking pin in the retracted position when the multi-coupling system is in the connected and unlocked state. The multi-coupling system may include one ore more of the following features, either individually or in combination.

In an exemplary embodiment of the multi-coupling system, the locking pin assembly includes a knob, and the operating lever is fixed about the knob and the operating lever operates the locking pin assembly by rotating the knob.

In an exemplary embodiment of the multi-coupling system, the operating lever is press fit over the knob.

In an exemplary embodiment of the multi-coupling system, the operating lever is made of a rigid plastic.

In an exemplary embodiment of the multi-coupling system, the operating lever is positioned about the locking pin assembly such that the user can manipulate the handle assembly and the operating lever simultaneously with one hand.

In an exemplary embodiment of the multi-coupling system, the operating lever is positionable in a ready position, a locked position, and a detented position. In the ready position, the first multi-coupling component and the second multi-coupling component are disengaged and the handle assembly is in a disconnected position; the operating lever is moved from the ready position to the locked position to rotate the pin assembly to lock the first multi-coupling component to the second multi-coupling component; and the operating lever is rotated from the locked position to the detented position for releasing first multi-coupling component and the second multi-coupling component.

In an exemplary embodiment of the multi-coupling system, movement of the handle assembly to the disconnected position rotates the operating lever from the detented position back to the ready position.

Another aspect of the invention is a second multi-coupling component for connecting to a first multi-coupling component in a multi-coupling system according to any of the embodiments, In exemplary embodiments, the second multi-coupling component includes a plurality of individual second fluid couplers, a handle assembly that is rotatable to configure the multi-coupling system between a disconnected state and a connected and locked state, a locking pin assembly that is attached to the handle assembly, the locking pin assembly including a locking pin that is moveable in an axial direction between an extended position and a retracted position, an operating lever configured to manipulate the locking pin assembly, and a housing that houses the plurality of individual second fluid couplers, the housing further including a locking pin hole. In the connected and locked state the locking pin is in the extended position in which a shaft end of the locking pin is located in the locking pin hole, thereby preventing rotation of the handle assembly. The locking pin assembly is manipulated by a user operation of the operating lever to move the locking pin from the extended position to the retracted position out from the locking pin hole to configure the multi-coupling system in a connected and unlocked state in which the handle assembly is rotatable to reconfigure the multi-coupling system to the disconnected state. The locking pin assembly is configured to automatically retain the locking pin in the retracted position when the multi-coupling system is in the connected and unlocked state. The second multi-coupling component may include one or more of the following features, either individually or in combination.

In an exemplary embodiment of the second multi-coupling component, the locking pin assembly includes a knob, and the operating lever is fixed about the knob, and the operating lever operates the locking pin assembly by rotating the knob.

In an exemplary embodiment of the second multi-coupling component, the operating lever is press fit over the knob.

In an exemplary embodiment of the second multi-coupling component, the operating lever is made of a rigid plastic.

In an exemplary embodiment of the second multi-coupling component, the operating lever is positioned about the locking pin assembly such that the user can manipulate the handle assembly and the operating lever simultaneously with one hand.

In an exemplary embodiment of the second multi-coupling component, the operating lever is positionable in a ready position, a locked position, and a detented position. In the ready position, the first multi-coupling component and the second multi-coupling component are disengaged and the handle assembly is in a disconnected position; the operating lever is moved from the ready position to the locked position to rotate the pin assembly to lock the first multi-coupling component to the second multi-coupling component; and the operating lever is rotated from the locked position to the detented position for releasing first multi-coupling component and the second multi-coupling component.

In an exemplary embodiment of the second multi-coupling component, movement of the handle assembly to the disconnected position rotates the operating lever from the detented position back to the ready position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-coupling system comprising:
a first multi-coupling component including a plurality of individual first fluid couplers; and
a second multi-coupling component including a plurality of individual second fluid couplers, the multi-coupling system being configurable between a connected and locked state and a disconnected state;
wherein:
in the connected and locked state at least a portion of the first fluid couplers respectively are fluidly connected to the second fluid couplers, and in the disconnected state the first fluid couplers and the second fluid couplers are disconnected, the multi-coupling system being further configurable in a connected and unlocked state; and
the second multi-coupling component comprises:
a locking pin assembly that is attached to a handle assembly, the locking pin assembly including a locking pin that is moveable in an axial direction between an extended position and a retracted position;
a housing that houses the plurality of individual second fluid couplers, the housing further including a locking pin hole; and
an operating lever configured to manipulate the locking pin assembly;
wherein:
in the connected and locked state the locking pin is in the extended position in which a shaft end of the locking pin is located in the locking pin hole, thereby preventing rotation of the handle assembly;
the locking pin assembly is manipulated by a user operation of the operating lever to move the locking pin from the extended position to the retracted position out from the locking pin hole to configure the multi-coupling system in the connected and unlocked state in which the handle assembly is rotatable to reconfigure the multi-coupling system to the disconnected state; and
the locking pin assembly is configured to automatically retain the locking pin in the retracted position when the multi-coupling system is in the connected and unlocked state.

2. The multi-coupling system of claim 1, wherein the locking pin assembly includes a knob, and the operating lever is fixed about the knob and the operating lever operates the locking pin assembly by rotating the knob.

3. The multi-coupling system of claim 2, wherein the operating lever is press fit over the knob.

4. The multi-coupling system of claim 1, wherein the operating lever is made of a rigid plastic.

5. The multi-coupling system of claim 1, wherein the operating lever is positioned about the locking pin assembly such that the user can manipulate the handle assembly and the operating lever simultaneously with one hand.

6. The multi-coupling system of claim 1, wherein the operating lever is positionable in a ready position, a locked position, and a detented position, wherein:
in the ready position, the first multi-coupling component and the second multi-coupling component are disengaged and the handle assembly is in a disconnected position;
the operating lever is moved from the ready position to the locked position to rotate the pin assembly to lock the first multi-coupling component to the second multi-coupling component; and
the operating lever is rotated from the locked position to the detented position for releasing first multi-coupling component and the second multi-coupling component.

7. The multi-coupling system of claim 6, wherein movement of the handle assembly to the disconnected position rotates the operating lever from the detented position back to the ready position.

8. A second multi-coupling component for connecting to a first multi-coupling component in a multi-coupling system, the second multi-coupling component comprising:
a plurality of individual second fluid couplers;
a handle assembly that is rotatable to configure the multi-coupling system between a disconnected state and a connected and locked state;
a locking pin assembly that is attached to the handle assembly, the locking pin assembly including a locking pin that is moveable in an axial direction between an extended position and a retracted position;

an operating lever configured to manipulate the locking pin assembly; and a housing that houses the plurality of individual second fluid couplers, the housing further including a locking pin hole;

wherein:

in the connected and locked state the locking pin is in the extended position in which a shaft end of the locking pin is located in the locking pin hole, thereby preventing rotation of the handle assembly;

the locking pin assembly is manipulated by a user operation of the operating lever to move the locking pin from the extended position to the retracted position out from the locking pin hole to configure the multi-coupling system in a connected and unlocked state in which the handle assembly is rotatable to reconfigure the multi-coupling system to the disconnected state; and the locking pin assembly is configured to automatically retain the locking pin in the retracted position when the multi-coupling system is in the connected and unlocked state.

9. The second multi-coupling component of claim 8, wherein the locking pin assembly includes a knob, and the operating lever is fixed about the knob, and the operating lever operates the locking pin assembly by rotating the knob.

10. The second multi-coupling component of claim 9, wherein the operating lever is press fit over the knob.

11. The second multi-coupling component of claim 8, wherein the operating lever is made of a rigid plastic.

12. The second multi-coupling component of claim 8, wherein the operating lever is positioned about the locking pin assembly such that the user can manipulate the handle assembly and the operating lever simultaneously with one hand.

13. The second multi-coupling component of claim 8, wherein the operating lever is positionable in a ready position, a locked position, and a detented position, wherein:

in the ready position, the first multi-coupling component and the second multi-coupling component are disengaged and the handle assembly is in a disconnected position;

the operating lever is moved from the ready position to the locked position to rotate the pin assembly to lock the first multi-coupling component to the second multi-coupling component; and the operating lever is rotated from the locked position to the detented position for releasing first multi-coupling component and the second multi-coupling component.

14. The second multi-coupling component of claim 13, wherein movement of the handle assembly to the disconnected position rotates the operating lever from the detented position back to the ready position.

* * * * *